United States Patent [19]

Gilmour et al.

[11] Patent Number: 5,043,951

[45] Date of Patent: Aug. 27, 1991

[54] APPARATUS FOR REDUCTION OF SIDE LOBES IN A BEAM PATTERN OF AN ARRAY

[75] Inventors: John E. Gilmour, Pasadena; Bruce C. Mitchell, Ellicott City, both of Md.

[73] Assignee: Westinghouse Electric Corp., Pittsburgh, Pa.

[21] Appl. No.: 561,549

[22] Filed: Aug. 1, 1990

[51] Int. Cl.[5] .............................................. G01S 3/80
[52] U.S. Cl. ..................................... 367/126; 367/905
[58] Field of Search ..................... 367/135, 136, , 124, 367/126, 129, 901, 905, 203; 342/203

[56] References Cited

U.S. PATENT DOCUMENTS 3,974,500  8/1976  Goldfischer ........................ 342/113
4,438,530  3/1984  Steinberger ........................ 342/361

Primary Examiner—Daniel T. Pihulic
Attorney, Agent, or Firm—D. Schron

[57] ABSTRACT

A square law detection circuit for energy signals such as sonar signals wherein the signal processing eliminates the side lobe detection of false targets by eliminating the side lobes themselves without significant energy degradation of the main lobe of the beam pattern associated with the sonar equipment.

10 Claims, 6 Drawing Sheets

APPARATUS FOR REDUCTION OF SIDE LOBES IN A BEAM PATTERN OF AN ARRAY

BACKGROUND OF THE INVENTION

1. Field of the Invention

The invention in general relates to beam forming arrays, and in particular, to apparatus for detecting the signals of the array to reduce side lobe response of the array beam pattern.

2. Background Information

A transducer array has directionality as defined by its beam pattern and when used as a receiver of energy, the arrival direction of the energy may be determined. The beam pattern generally has a direction of maximum sensitivity, or response, which lies along an acoustic axis as well as a plurality of lower intensity responses, known as side lobes, lying along other axes relative to the acoustic axis.

In order to avoid undesired detections of targets or clutter in the side lobes, the output signals of the elements of the array may be weighted, by a process known as shading, to reduce side lobe response. Although shading may significantly reduce the side lobes, they are still present and may still indicate a false target under certain circumstances. In the present invention, the elements of the array are square law detected in a manner to completely eliminate positive side lobes while minimizing any degradation in the main lobe lying along the acoustic axis.

SUMMARY OF THE INVENTION

Apparatus is provided for square law detection of the signals produced by elements of an array in response to impingement of energy. The apparatus includes first circuit means operable to process the signals of the elements to derive the first signal. Second circuit means are also provided and include means for squaring each signal of the elements to derive a second signal which is a scaled submation of the squared signals where the scaling factor is k and where k is variable and has a positive value between 0 and 1. Means are provided for subtracting the second signal from the first signal and a low pass filter is connected in circuit for eliminating any double frequency terms.

DESCRIPTION OF THE PREFERRED EMBODIMENTS

Figure 1:
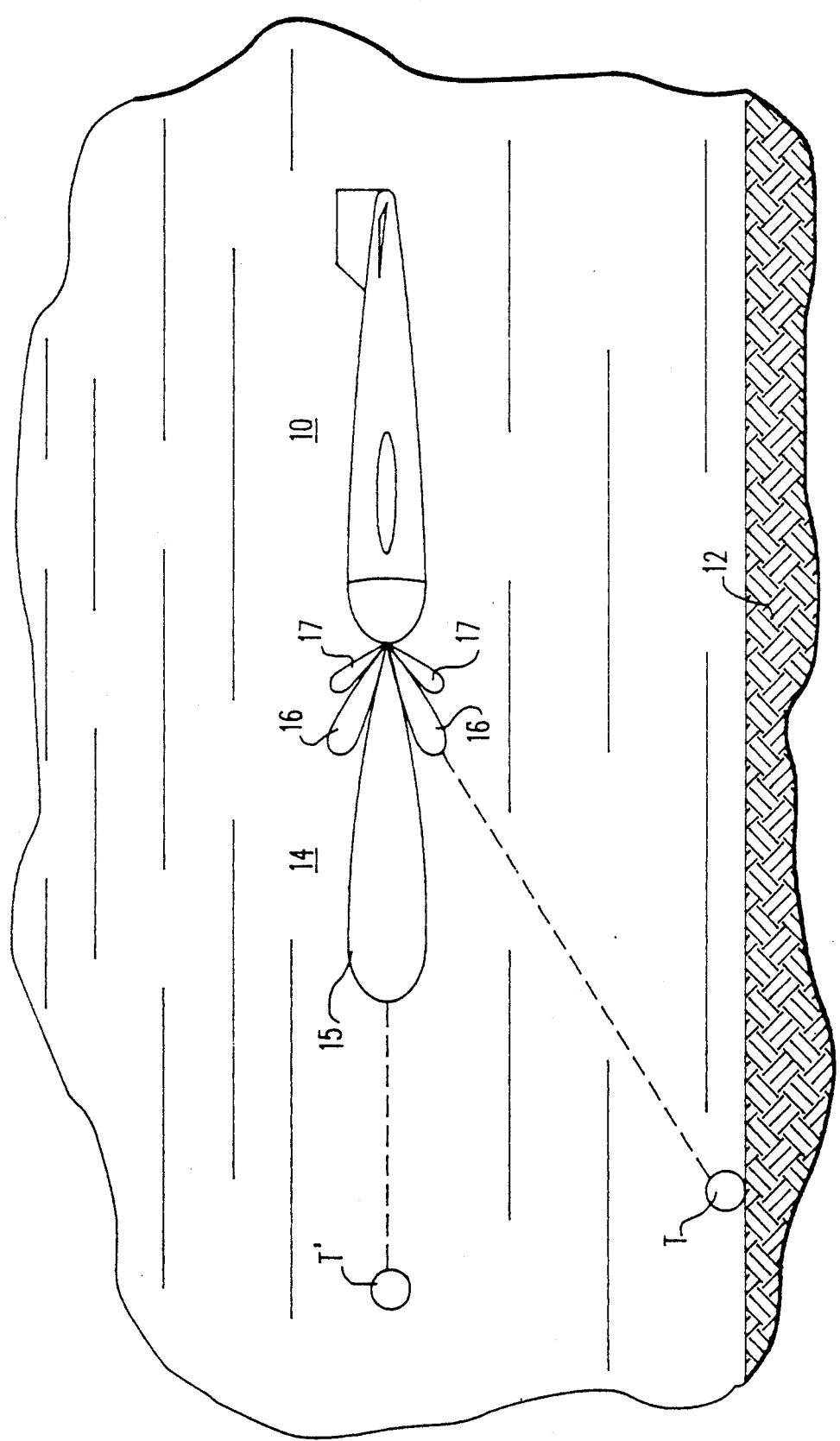
FIG. 1 illustrates an underwater vehicle and the beam pattern formed by sonar apparatus carried by the vehicle.

Although the present invention is applicable to the electromagnetic as well as acoustic systems, it will be described by way of example with respect to an underwater sonar system such as illustrated in FIG. 1

Figure 2:
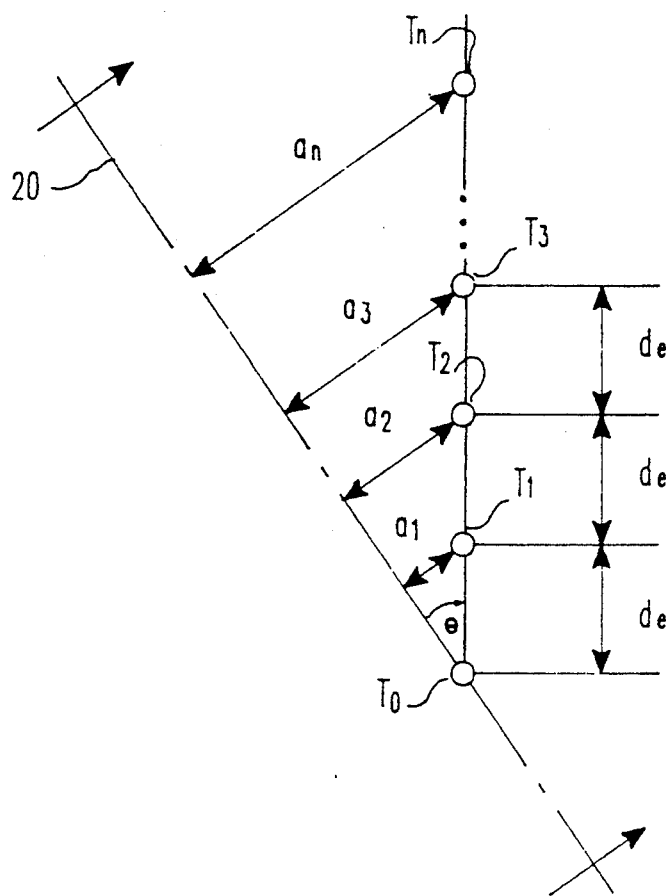
FIG. 2 illustrates an array of elements and respective signals provided as a result of impingement of an acoustic wave.

In FIG. 1, an underwater carrier vehicle 10 proceeds along a predetermined course above the bottom 12 of a body of water. The vehicle 10 includes sonar apparatus which forms a receiver beam 14 having a characteristic main lobe 15 as well as a plurality of side lobes 16 and 17. During course of travel of the vehicle 10, acoustic pulses are transmitted and are reflected back by potential targets of interest. An acoustically reflective target T on the bottom 12 can reflect acoustic energy in a manner that it is detected by means of side lobe 16. The sonar apparatus cannot determine that the response was in a side lobe and accordingly will provide a false target indication. That is, the received energy is assumed to be in the main lobe which would provide an indication of a target T' which in reality is a phantom target not actually in the position indicated. Accordingly, the elimination or reduction of side lobes is desirable to eliminate or minimize false alarms. Before proceeding with the detailed description of the present invention, reference is made to FIG. 2 to illustrate a transducer array and the signals provided by the transducers. A straight line array is illustrated by way of example and includes $N+1$ transducer elements labeled $T_0$ to $T_n$ each separated from its neighbor by a distance de. Numeral 20 represents a wave front impinging upon the array at an angle $\theta$ and is illustrated at a time when it just touches transducer $T_0$. At later points in time, the wave front will impinge upon transducer $T_1$ after travelling a distance of $a_1$, will impinge upon transducer $T_2$ after travelling a distance of $a_2$, will impinge upon transducer $T_3$ after travelling a distance of $a_3$ etc. From geometry:

$$a_0 = 0 \quad (1)$$

$$a_1 = de \sin \theta \quad (2)$$

$$a_2 = (2) de \sin \theta \quad (3)$$

$$a_3 = (3) de \sin \theta \quad (4)$$

$$a_n = (n) de \sin \theta \quad (5)$$

The signal $S_0$ provided by transducer $T_0$ taken as a reference is $S_0 = \cos(wt)$. The remaining transducers will provide similar signals, however, displaced in phase by an amount dependent upon the distances $a_1$, $a_2$, $a_3$, etc. Substituting the above values for $a_0$ to $a_n$ and converting to radians, the signals provided by the respective transducers of the array are:

$$S_0 = \cos(\omega t) \quad (6)$$

$$S_1 = \cos\left(\omega t - \frac{2\pi}{\lambda} de \sin \theta\right) \quad (7)$$

$$S_2 = \cos\left(\omega t - \frac{2\pi}{\lambda} (2) de \sin \theta\right) \quad (8)$$

$$S_3 = \cos\left(\omega t - \frac{2\pi}{\lambda}(3)\, de\, \sin\theta\right) \qquad (9)$$

$$S_n = \cos\left(\omega t - \frac{2\pi}{\lambda}(n)\, de\, \sin\theta\right) \qquad (10)$$

Figure 3:
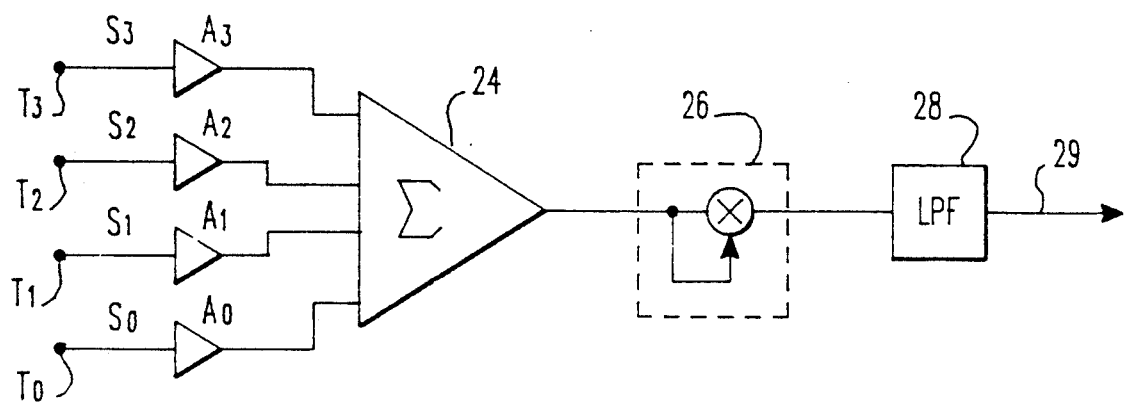
FIG. 3 is a block diagram of a prior art square law detector.

One method by which the output signals of the array may be processed is by conventional square law detection as illustrated in FIG. 3. For convenience, only a four transducer linear array is depicted. Each transducer output signal is amplified in respective amplifiers $A_0$ to $A_3$ and thereafter the signals are summed together in summing circuit 24. Thereafter, the summed signals are multiplied by themselves in squaring circuit 26, the output signal of which is represented by:

$$(S_0 + S_1 + S_2 + S_3)^2 \qquad (11)$$

The multiplication process results in double frequency terms which are eliminated with the inclusion of a low pass filter 28 such that the array output signal appears on output line 29.

Figure 4:
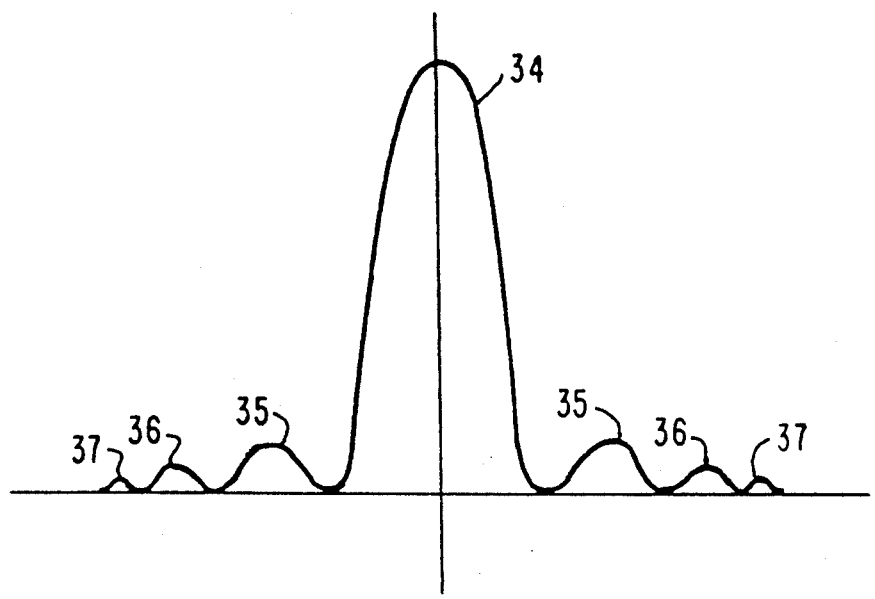
FIG. 4 is a beam pattern obtained utilizing square law detection of the prior art.

FIG. 4 illustrates an idealized beam pattern for the array of FIG. 3 after square law detection. Amplitude is plotted on the vertical axis and angle is plotted on the horizontal axis and it is seen that the beam pattern includes a main lobe 34 in which most of the energy is concentrated, and a plurality of undesirable side lobes 35, 36, and 37.

In order to minimize side lobe response so as to minimize false alarms, the pattern of the array may be controlled by a method known as shading. In the shading process, the responses of the transducers of the array may be adjusted to provide a maximum response at the center and progressively smaller responses toward the ends of the array. A popular form of shading is known as amplitude shading wherein the amplifiers connected to receive the output signals of the transducer elements are adjusted to provide predetermined gains in accordance with the shading function. Thus, the typical beam pattern of FIG. 4 may be modified to that illustrated in FIG. 5, wherein the original side lobes are shown dotted and the side lobes after shading are designated with corresponding primed numerals.

Figure 6:
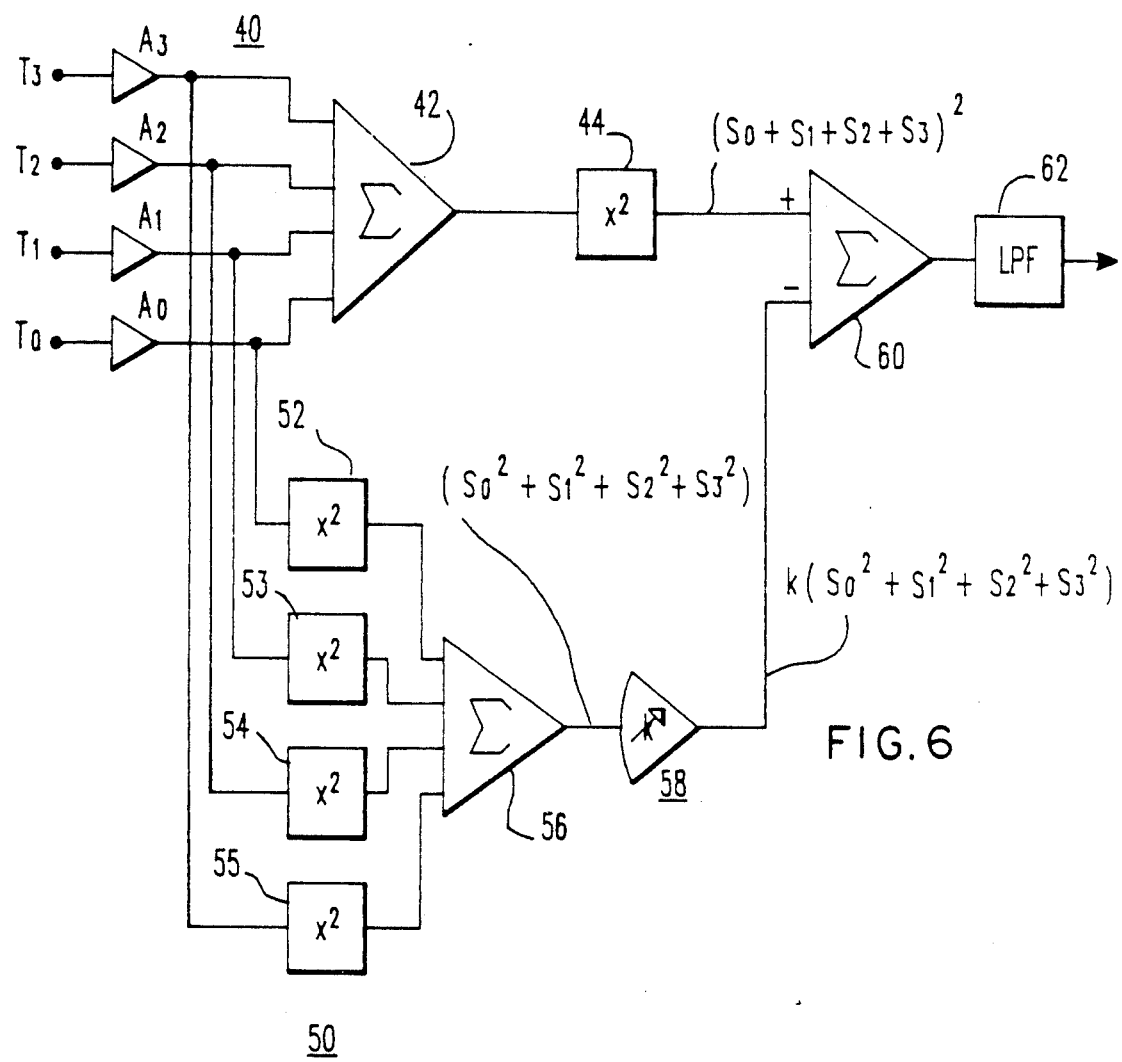
FIG. 6 is a block diagram illustrating one embodiment of the present invention.

FIG. 6 illustrates one embodiment of the present invention for eliminating positive detrimental side lobes without significantly reducing the energy available in the main lobe of the beam pattern. First circuit means 40 is provided for processing the signals of the transducer elements to derive a first signal. In the embodiment of FIG. 6, the elements for deriving this first signal are similar to those of a conventional circuit illustrated in FIG. 3 in that the first circuit means includes a summing circuit 42 which is operable to receive the signals provided by transducer elements $T_0$ through $T_3$ suitably amplified by respective amplifiers $A_0$ through $A_3$. The output of the summing circuit 42 is squared in squaring circuit 44 the output signal of which is:

$$(S_0 + S_1 + S_2 + S_3)^2$$

The apparatus additionally includes second circuit means 50 having squaring circuits 52 to 55 for respectively squaring each of the transducer element output signals. The squared signals are summed in summing circuit 56, the output signal of which is:

$$S_0^2 + S_1^2 + S_2^2 + S_3^2 \qquad (12)$$

This signal is provided to a scaling amplifier 58, which may be a conventional op amp having an adjustable scaling factor k, to derive an output signal equal to:

$$k(S_0^2 + S_1^2 + S_2^2 + S_3^2) \qquad (13)$$

This latter signal is subtracted from the signal provided by squaring circuit 44 in summing circuit 60 and the result is provided to a low pass filter 62, the output of which is the detected beam signal.

The output of squaring circuit 44 is the square of the sum of the signals which, expanded mathematically, is equivalent to:

$$[2(S_0 S_1 + S_0 S_2 + S_1 S_2 + S_1 S_3 + S_2 S_3) + [S_0^2 + S_1^2 + S_2^2 + S_3^2]] \qquad (14)$$

Figure 7:
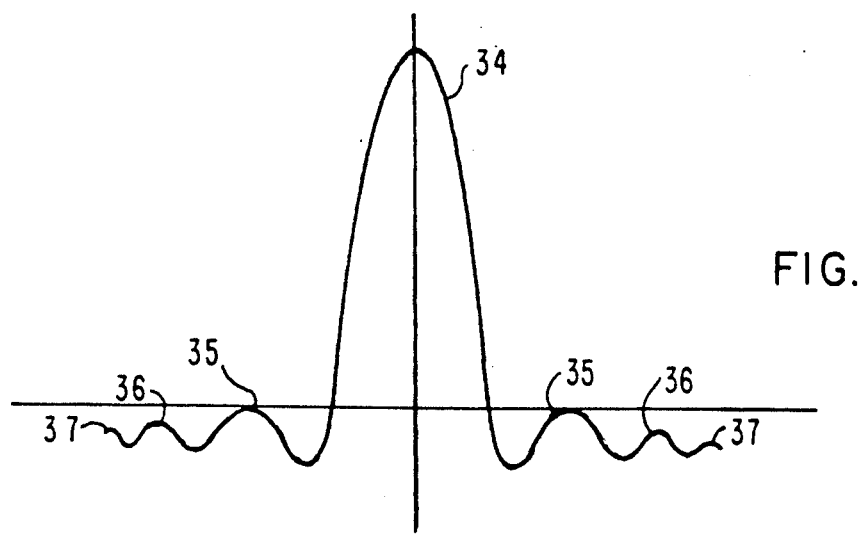
FIG. 7 is a beam pattern obtained by the apparatus of FIG. 6 at one extreme of scaling.
Figure 8:
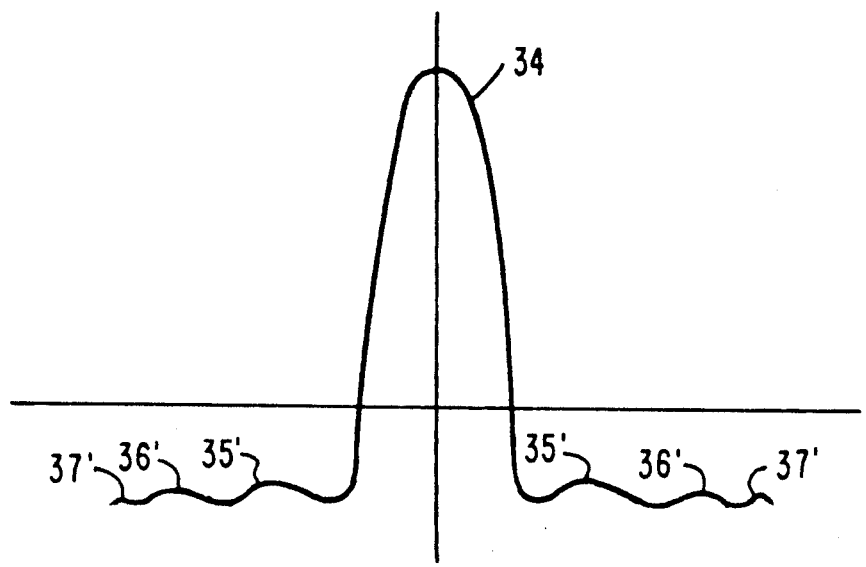
FIG. 8 illustrates the beam of FIG. 7 utilizing shading.

The first bracketed term in expression 14 is indicative of the cross products of the transducer element signals while the second bracketed term is the sum of the squares of the transducer element signals as provided at the output summing circuit 56. If the scaling factor k is chosen to be equal to 1, summing circuit 60 performs the operation of subtracting expression 12 from expression 14 with the result being elimination of all positive side lobes as indicated by the beam pattern of FIG. 7 wherein the first side lobe 35 just touches the horizontal axis having an amplitude value of 0. Although the positive side lobes have been completely eliminated, it is seen that the amplitude of the main lobe 34 has been decreased by an amount equivalent to the magnitude of the first side lobe 35. By the application of shading, such as by selecting predetermined gains for the amplifiers $a_0$ to $a_3$, the sides lobes of FIG. 7 may be significantly reduced as illustrated by the beam pattern of FIG. 8.

Figure 5:
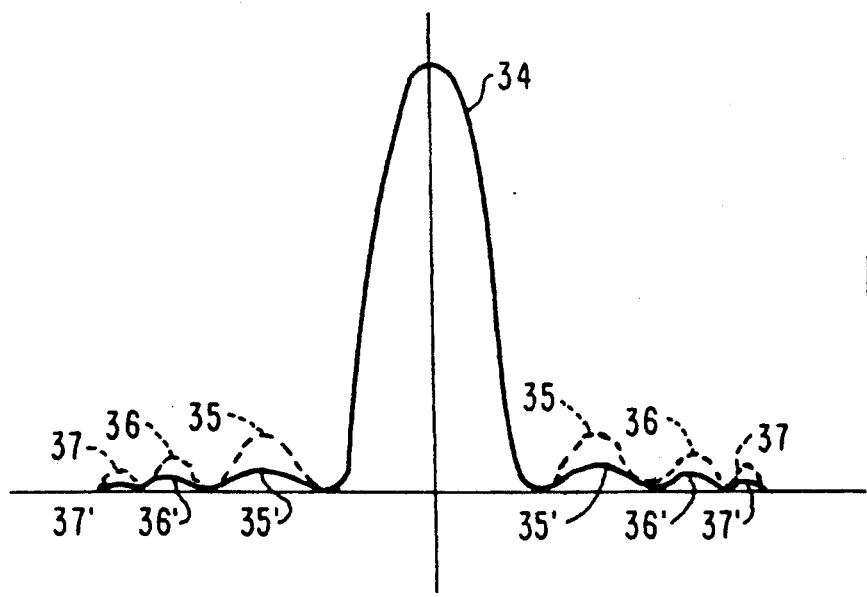
FIG. 5 illustrates the beam pattern of FIG. 4 wherein the side lobe response is modified by means of shading.

At the other extreme, if the scaling factor k is equal to 0, nothing is subtracted from expression 14 and a conventional beam pattern of FIG. 4 results or if shading is used the conventional shaded beam pattern as illustrated in FIG. 5 results.

Figure 9:
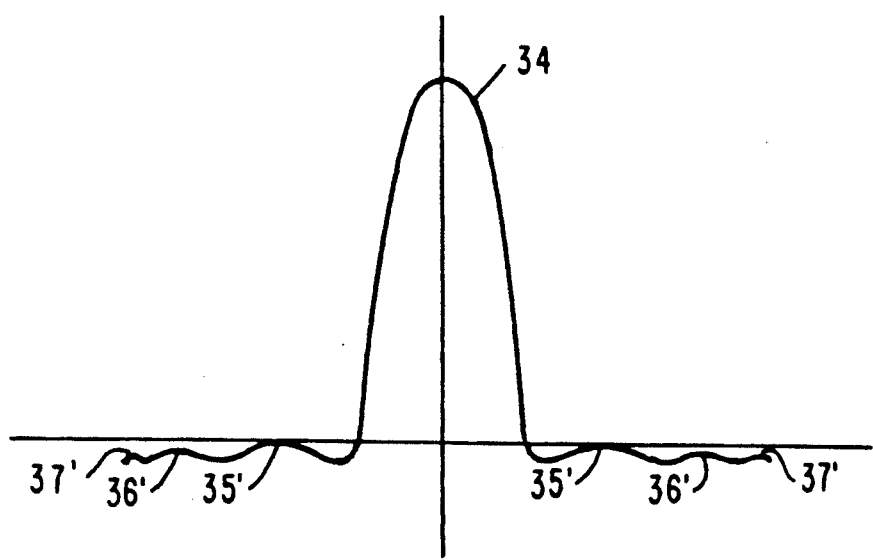
FIG. 9 illustrates the beam of FIG. 8 with a different scaling factor.

By adjusting the scaling factor k, a proportionate smaller amount of the sum of the squared signal is subtracted and this has the effect of shifting the beam pattern up so a to make the main lobe 34 more positive. With proper selection of k, the shaded beam pattern of FIG. 8 may be shifted upwards so that the first side lobe 35' just touches the horizontal axis as illustrated in FIG. 9, thereby minimizing the degradation in the main lobe while still eliminating side lobe false alarms since the side lobes are negative.

The circuitry of FIG. 6 illustrates the mathematical treatment of the signals for positive side lobe elimination. Other arrangements to accomplish the same function are possible and one such other arrangement is illustrated by way of example in FIG. 10.

Figure 10:
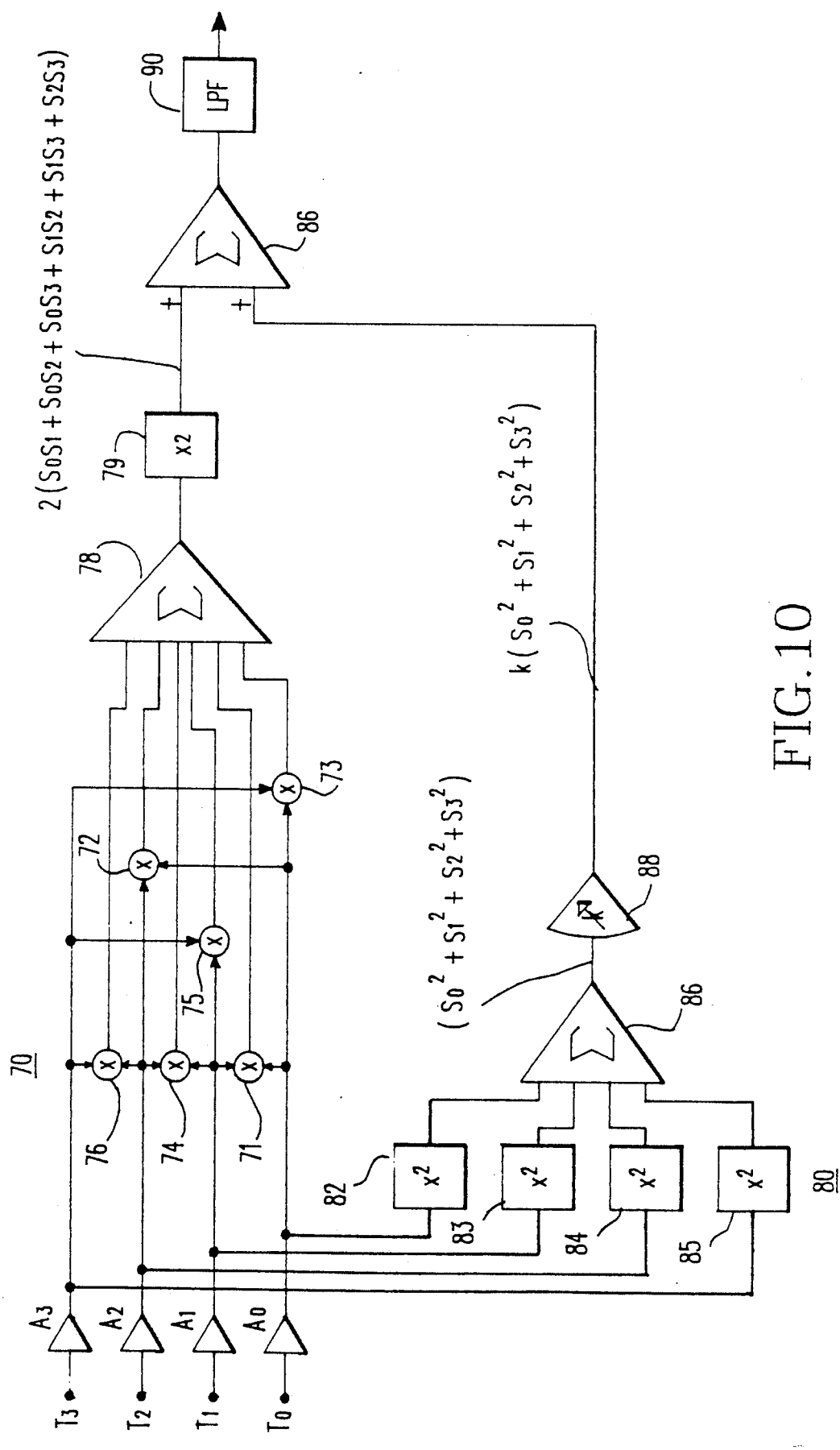
FIG. 10 is a block diagram illustrating another embodiment of the present invention.

In the embodiment of FIG. 10, the first circuit means 70 includes a plurality of multipliers 71 to 76 for obtaining predetermined cross products of the transducer element output signals. The cross products are summed in summing circuit 78 and multiplied by a factor of 2 in multiplier circuit 79 to derive a signal equivalent to the first bracketed term of expression 14.

The second circuit means 80 includes a plurality of squaring circuits 82 through 85 each for squaring a respective one of the transducer element output signals with the squared signals being summed in summing circuit 86, the output of which is the sum of the squares as indicated in expression 12. An op amp 88 provides the adjustable scaling factor k so that its output signal is equivalent to expression 13. The two inputs to summing circuit 86 therefore are the two bracketed terms of expression 14 which in the embodiment of FIG. 10 are added to one another and provided to low pass filter 88 for elimination of any double frequency terms.

The operation of the arrangement of FIG. 10 is similar to that of FIG. 6, however, to completely eliminate positive side lobes, the scaling factor k is 0 as opposed to 1 as in the FIG. 6 embodiment. Increasing the value of k has the effect of shifting the beam patter upwards so that the main lobe becomes more positive while still maintaining shaded side lobes in the negative region, as portrayed by the beam pattern of FIG. 9.

Accordingly, there has been provided apparatus which by a novel square law detection technique avoids undesired detections of targets or clutter in the side lobes of the sonar system while minimizing the degradation of the main lobe in view of the fact that a relatively small portion of the energy in the side lobes subtracts from the main lobe. Two representative embodiments for performing the mathematical operation involved have been illustrated by way of example and for simplicity, only four transducer elements in a line array are utilized, it being understood that a greater plurality of elements may be utilized in a straight or curved line array either fully populated, as illustrated, or in a minimum redundancy array in which certain redundant transducer elements may be deleted while still preserving beam pattern and gain characteristics of the full array. The transducer element signals presented in expressions 11–14 in general will have amplitude shading factors associated with them, however, for ease of understanding such shading factors have not been illustrated.

We claim:

1. Apparatus for square law detection of the signals produced by elements of an array in response to impingement of energy, comprising:
  a) first circuit means for processing said signals of said elements to derive a first signal;
  b) second circuit means including adjustable scaling means and including means for squaring each said signal of said elements, to derive a second signal which is a scaled summation of the signals squared by said means for squaring, where the scaling factor is k;
  c) means for combining said first and said second signals to derive a third signal; and
  d) a low pass filter connected in circuit for eliminating double frequency terms.

2. Apparatus according to claim 1 wherein:
  a) said factor k is variable and $0<k<1$.

3. Apparatus according to claim 1 wherein
  a) said elements are elements of a sonar receiver transducer and they provide respective output signals in response to impingement of acoustic energy.

4. Apparatus according to claim 1 wherein:
  a) said low pass filter is connected in circuit subsequent to the generation of said third signal.

5. Apparatus according to claim 1 wherein said first circuit means includes:
  a) means for summing the signals of said elements; and
  b) means for squaring the signal provided by said means for summing to derive said first signal.

6. Apparatus according to claim 5 wherein:
  a) said second signal is subtracted from said first signal.

7. Apparatus according to claim 1 wherein said first circuit means includes:
  a) means for obtaining predetermined cross products of the signals of said elements;
  b) means for summing said cross products; and
  c) means for multiplying the signal provided by said means for summing by a factor of two to derive said first signal.

8. Apparatus according to claim 7 wherein:
  a) said second signal is added to said first signal.

9. Apparatus according to claims 1, 6 or 8 which includes:
  a) means for shading the signals of said elements to reduce side lobe response.

10. Apparatus according to claim 9 wherein:
  a) said signals of said elements are amplitude shaded.

* * * * *